(12) United States Patent
Mergard et al.

(10) Patent No.: US 6,791,554 B1
(45) Date of Patent: Sep. 14, 2004

(54) I/O NODE FOR A COMPUTER SYSTEM INCLUDING AN INTEGRATED GRAPHICS ENGINE

(75) Inventors: James Mergard, Austin, TX (US);
Dale E. Gulick, Austin, TX (US);
Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 188 days.

(21) Appl. No.: 10/034,560

(22) Filed: Dec. 27, 2001

(51) Int. Cl.[7] ............................................... G06F 15/76
(52) U.S. Cl. .................................... 345/519; 345/520
(58) Field of Search .............................. 345/519, 501, 345/520, 559, 530; 710/52, 306, 305

(56) References Cited

U.S. PATENT DOCUMENTS

| | | | |
|---|---|---|---|
| 6,278,532 B1 | | 8/2001 | Heimendinger et al. |
| 6,347,344 B1 | * | 2/2002 | Baker et al. .................. 710/20 |
| 6,414,525 B2 | | 7/2002 | Urakawa |
| 6,496,505 B2 | * | 12/2002 | La Porta et al. ............ 370/392 |
| 6,571,321 B2 | * | 5/2003 | Rowlands et al. .......... 711/141 |
| 6,609,167 B1 | * | 8/2003 | Bastiani et al. ............. 710/104 |

OTHER PUBLICATIONS

U.S. patent application Ser. No. 09/978,349 Filed Oct. 15, 2001.
U.S. patent application Ser. No. 10/093,146 Filed Mar. 7, 2002.

* cited by examiner

*Primary Examiner*—Kee M. Tung
(74) *Attorney, Agent, or Firm*—Meyertons Hood Kivlin Kowert & Goetzel, P; B. Noël Kivlin; Stephen J. Curran

(57) ABSTRACT

An I/O node for a computer system including an integrated graphics engine. An input/output node is implemented upon an integrated circuit chip. The I/O node includes a first transceiver unit, a second transceiver unit, a packet tunnel, a graphics engine and a graphics interface. The first transceiver unit may receive and transmit packet transactions on a first link of a packet bus and the second transceiver unit may receive and transmit packet transactions on a second link. The packet tunnel may convey selected packet transactions between the first and the second transceiver unit. The graphics engine may receive graphics packet transactions from the first transceiver unit and may render digital image information in response to receiving the graphics transactions. The graphics interface may receive additional graphics packet transactions from the first transceiver unit and may translate the additional graphics packet transactions into transactions suitable for transmission upon a graphics bus.

27 Claims, 3 Drawing Sheets

I/O NODE FOR A COMPUTER SYSTEM INCLUDING AN INTEGRATED GRAPHICS ENGINE

BACKGROUND OF THE INVENTION

1. Field of the Invention

This invention relates to computer system graphics and, more particularly, to I/O nodes including integrated graphics functionality.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by I/O devices is a peripheral component interconnect (PCI) bus.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a computer system may connect to a graphics adapter through a graphics bus such as an accelerated graphics port (AGP) bus. The graphics bus may be connected to an AGP interface that may translate AGP transactions into packet transactions. The AGP interface may communicate with a host bridge associated with one of the processors for access to a system memory.

Many processors connect to the system graphics engine via an AGP port embedded in a system controller. The system controller may be manufactured on one integrated circuit chip that may be part of a chipset. In the case of a system using I/O nodes, the I/O node may be manufactured in an integrated circuit chip. The integrated circuit chip containing the I/O node may include an AGP interface for connection to a graphics bus and ultimately to a graphics adapter. In systems using I/O nodes connected to the system processor through a packet bus, an interface such as the AGP interface may have some latency associated with it, thus an I/O node that may use the packet bus for graphics transactions may be desirable.

SUMMARY OF THE INVENTION

Various embodiments of an I/O node for a computer system including an integrated graphics engine are disclosed. In one embodiment, an input/output node for a computer system that is implemented on an integrated circuit chip includes a first transceiver unit, a second transceiver unit, a packet tunnel, a graphics engine and a graphics interface.

The first transceiver unit may be configured to receive and transmit packet transactions on a first link of a packet bus. The second transceiver unit may be coupled to receive and transmit packet transactions on a second link of the packet bus. The packet tunnel is coupled to convey selected packet transactions between the first transceiver unit and the second transceiver unit. The graphics engine is coupled to receive graphics packet transactions from the first transceiver unit and may be configured to render digital image information in response to receiving the graphics transactions. The graphics engine may further provide display signals corresponding to the digital image information for display on a display device such as an RGB monitor or an LCD screen, for example. The graphics interface is coupled to receive additional graphics packet transactions from the first transceiver unit and may be configured to translate the additional graphics packet transactions into transactions suitable for transmission upon a graphics bus, such as an AGP bus.

In one particular implementation, the I/O node further includes a control unit that is coupled to control the conveyance of the selected packet transactions between the first transceiver unit and the second transceiver unit. Further the control unit may be coupled to control the conveyance of the graphics packet transactions and the additional graphics packet transactions between the first transceiver unit and the graphics engine and between the first transceiver unit and the graphics interface, respectively. In another implementation, the graphics engine includes a configuration register, which may provide a user selectable bit for enabling and disabling the graphics engine.

In another embodiment, the first transceiver unit may be configured to receive and transmit packet transactions on a first link of a packet bus. The second transceiver unit may be coupled to receive and transmit packet transactions on a second link of the packet bus. The packet tunnel is coupled to convey selected packet transactions between the first transceiver unit and the second transceiver unit. The graphics interface is coupled to receive graphics packet transactions from the first transceiver unit and may be configured to translate the packet transactions into transactions suitable for transmission upon a graphics bus, such as an AGP bus. The graphics engine is coupled to receive graphics transactions from the graphics interface and may be configured to render digital image information in response to receiving the graphics transactions. The graphics engine may further provide display signals corresponding to the digital image information for display on a display device such as an RGB monitor or an LCD screen, for example.

Figure 1:
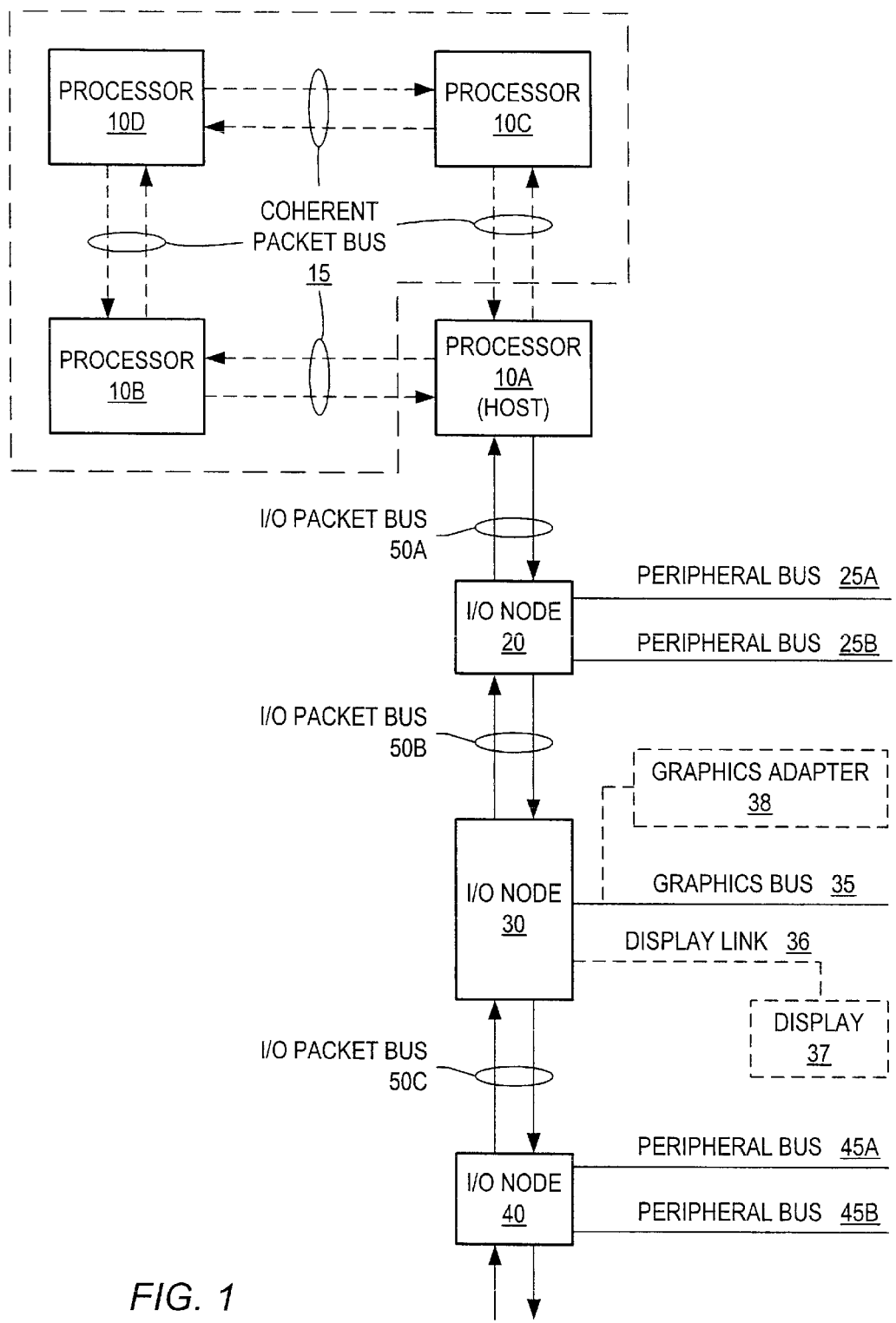
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to point links it is noted that other numbers of processors may be used and other types of buses may interconnect them. The computer system also includes three I/O nodes numbered 20, 30 and 40 each connected together in a chain by I/O packet bus links 50B and 50C respectively. I/O packet bus link 50A is coupled between host node/processor 10A and I/O node 20. Processor 10A is illustrated as a host node which may include a host bridge (not shown) for communicating with I/O nodes 20, 30 and 40 via I/O packet buses 50A–C. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35 and to a display 37 though a display link 36. I/O node 40 is connected to another pair of peripheral buses 45A and 45B.

Processors 10A–10D are each illustrative of, for example, an x86 microprocessor such as an Athlon™ microprocessor. One example of a packet bus such as I/O packet bus 50A–50C may be a non-coherent HyperTransport™. Peripheral buses 25A–B and peripheral buses 45A–B are illustrative of a common peripheral buses such as a peripheral component interconnect (PCI) bus or an extended peripheral component interconnect (PCI-X) bus. Graphics bus 35 is illustrative of an accelerated graphics port (AGP) bus, for example. Display 37 is an example of a computer display such as a red, green, blue (RGB) monitor or a digital display such as a liquid crystal display (LCD), for example. Display link 36 is illustrative of an analog RGB link or a digital display bus. It is understood, however that in other embodiments, other types of microprocessors, peripheral buses and displays may be used.

It is noted that while three I/O nodes are shown connected to host processor 10A, other embodiments may have other numbers of nodes and those nodes may be connected in other topologies. It is understood that the chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, an I/O node such as I/O node 30 may translate transactions such as AGP bus transactions into upstream packet transactions that travel in I/O streams. I/O node 30 may additionally translate downstream packet transactions into AGP bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a graphics adapter 38 connected to graphics bus 35 initiates an AGP transaction, such as a read command, directed to a system memory (not shown). The AGP transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. It is noted that other embodiments may encode other identifiers and information into the packet header. Each packet may be assigned a Unit ID that identifies the originating node in addition to a destination node identifier. I/O node 20 may forward packets by transmitting them upstream to the host bridge of processor 10A. Once the requested data is delivered to the host bridge of processor 10A, the data packets are transmitted back downstream with a Unit ID of the host bridge of processor 10A through I/O node 20 to I/O node 30. I/O node 30 recognizes and claims the data packets for the graphics adapter on graphics bus 35. I/O node 30 may then translate the packets into AGP bus transactions and transmit the AGP transactions to graphics adapter 38 via graphics bus 35.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic. Thus, an I/O node such as I/O node 30 may control the injected graphics traffic.

As will be described in greater detail below, in addition to I/O node 30 providing an AGP interface for graphics adapters that may be connected to graphics bus 35, I/O node 30 may also provide an integrated graphics engine for connection to a display such as display 37.

Figure 2:
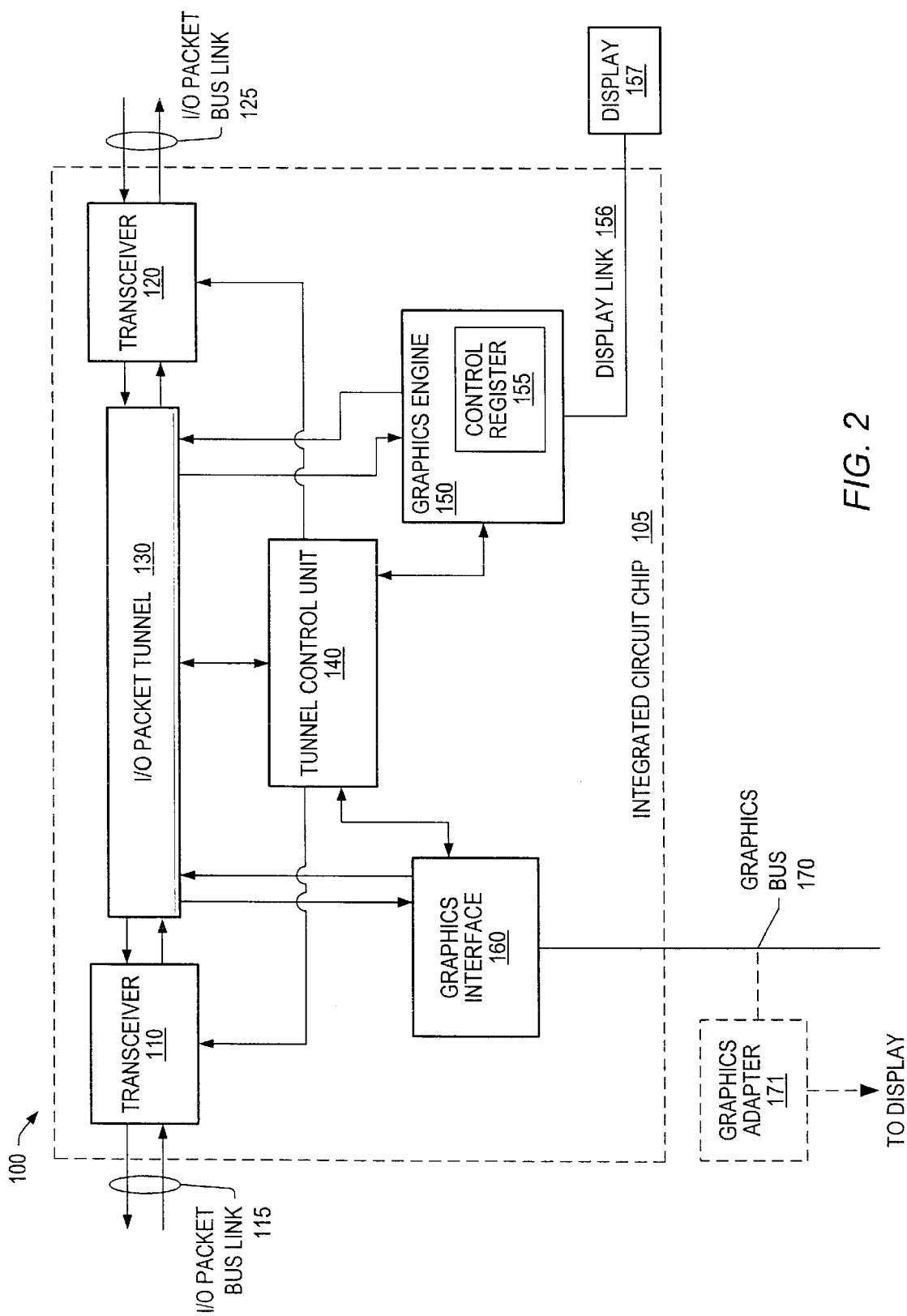
FIG. 2 is a block diagram of one embodiment of an I/O node including an integrated graphics engine.

Referring to FIG. 2, a block diagram of one embodiment of an I/O node including an integrated graphics engine is shown. I/O node 100 is implemented on a single integrated circuit chip 105. I/O node 100 includes a transceiver unit 110 which is coupled to an I/O packet bus link 115 and a transceiver unit 120 which is coupled to an I/O packet bus link 125. I/O node 100 also includes an I/O packet tunnel 130 which is coupled between transceivers 110 and 120. I/O node 100 further includes an integrated graphics engine 150, and a graphics interface 160 which are both coupled to I/O packet tunnel 130. In addition, tunnel control unit 140 is coupled to control the conveyance of transactions through I/O node 100. Graphics engine 150 is coupled to a display via a display link 156, while graphics interface 160 is coupled to graphics adapter 171 via graphics bus 170. Graphics engine 150 also includes a control register unit 155 which may include one or more configuration registers (not shown).

Transceivers 110 and 120 may be configured to transmit and receive packet transactions over I/O packet bus links 115 and 125, respectively. Transceivers 110 and 120 may include buffers and control logic (not shown) necessary to buffer incoming and outgoing packets. Transceivers 110 and 120 may also each include I/O packet tunnel interface logic (not shown) for transmitting packet transactions within I/O node 100. In addition, transceivers 110 and 120 may also be configured to provide control commands for use by tunnel control unit 140.

I/O packet tunnel 130 may include a collection of internal packet bus structures (not shown) used to convey packet transactions internal to I/O node 100. The internal packet bus structures may include command, data and control buses used to convey packets between transceivers 110 and 120 and to convey graphics packets between transceiver 110 and graphics engine 150. In addition, I/O packet tunnel 130 may convey graphics packets between graphics interface 160 and transceiver 110.

Tunnel control unit 140 may include circuitry (not shown) for controlling the conveyance of packets as described above. The circuitry may include arbitration, fairness and buffering circuits which may be used to determine the injection transaction flow rate.

In a typical computer system, a processor may send graphics commands to an external graphics adapter such as graphics adapter 171. In the illustrated embodiment, graphics adapter 171 may include a graphics processor and circuitry (not shown) for generating or rendering digital images and converting the images into signals suitable for use by a display. Graphics adapter 171 may also transmit the digital images for storage in a system memory for subsequent retrieval. Graphics interface 160 may be used to translate transactions between the I/O packet bus protocol and a graphics bus protocol such as the AGP protocol, for example. As mentioned above, graphics interface 160 may also translate bus cycles received from graphics bus 170 into packet transactions for transmission on I/O packet bus links 115 or 125. In addition, graphics interface 160 may translate graphics packet transactions into bus cycles suitable for transmission upon graphics bus 170. Graphics interface 160 may also include arbitration and buffering logic (not shown) for scheduling graphics bus transactions and maintaining graphics transaction ordering rules.

As an alternative to using an external graphics adapter, a processor may send graphics commands to graphics engine 150. Graphics engine 150 may include a graphics processor and circuitry (not shown) for generating or rendering digital images and converting the images into signals suitable for use by display 157. Graphics engine 150 may also transmit the digital images for storage in a system memory for subsequent retrieval. It is contemplated that the graphics signals may be in either an analog or digital format. Display 157 may be a display such as an RGB monitor or an LCD display. Control register unit 155 may be configured to selectively enable or disable graphics engine 150. In addition, it is contemplated that control register unit 155 may also be configured to select other graphics related functions such as display resolution and timing, for example. Graphics engine 150 may also translate downstream packetized graphics commands and digital images into commands and data suitable for use by graphics engine 150. In addition, graphics commands and digital images may be translated into packet transactions for transmission upstream on I/O packet bus links 115 or 125.

Since in typical computer systems only one graphics processor may be in use at a given time, graphics engine 150 may be disabled while an external graphics adapter is used. Contrariwise, graphics engine 150 may be enabled when there is no external graphics adapter being used.

Therefore, by integrating a graphics engine such as graphics engine 150 into the integrated circuit chip of an I/O node, and thus utilizing the native packet bus protocol, there may be a decrease in the latency of transactions between graphics engine 150 and an upstream device such as processor 10A of FIG. 1.

Figure 3:
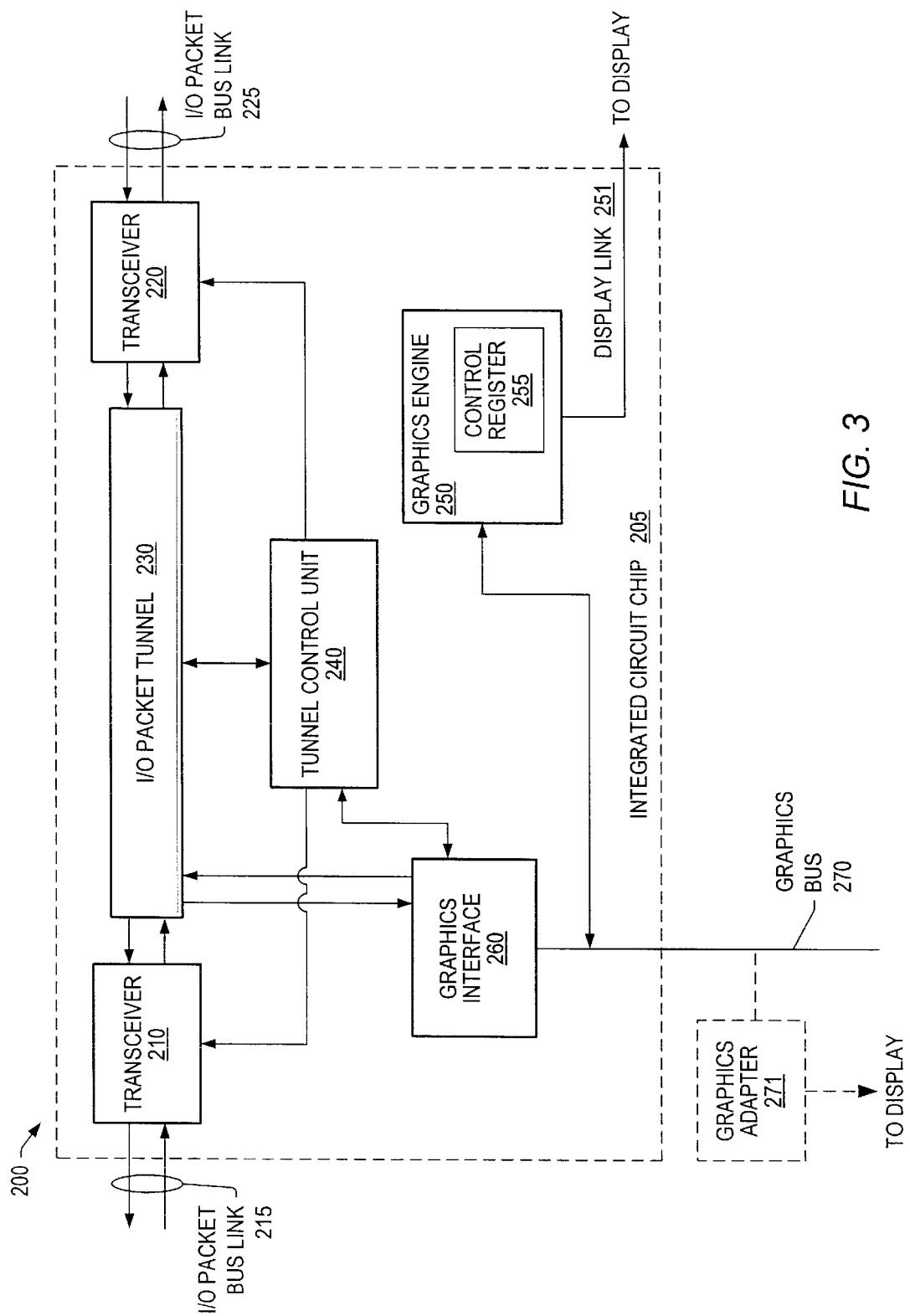
FIG. 3 is a block diagram of another embodiment of an I/O node including an integrated graphics engine.

Turning to FIG. 3, a block diagram of another embodiment of an I/O node including an integrated graphics engine is shown. I/O node 200 is implemented on a single integrated circuit chip 205. I/O node 200 includes a transceiver unit 210 which is coupled to an I/O packet bus link 215 and a transceiver unit 220 which is coupled to an I/O packet bus link 225. I/O node 200 also includes an I/O packet tunnel 230 which is coupled between transceivers 210 and 220. In addition, tunnel control unit 240 is coupled to control the conveyance of transactions through I/O node 200. I/O node 200 further includes an integrated graphics engine 250, and a graphics interface 260. Graphics engine 250 may be coupled to a display via a display link 251, while graphics interface 260 is coupled to graphics adapter 271 via graphics bus 270. Graphics engine 250 is coupled to graphics interface 260 via graphics bus 270. Graphics engine 250 also includes a control register unit 255 which may include one or more configuration registers (not shown).

Transceivers 210 and 220, I/O packet tunnel 230 and tunnel control unit 240 may be configured to operate in substantially the same manner as the descriptions of the correspondingly named units of FIG. 2 above. In contrast to the above description however, graphics engine 250 is coupled to graphics interface 260. Thus, I/O packet tunnel 230 may only convey graphics packet transactions between transceiver unit 210 and graphics interface 260.

In a typical computer system, a processor may send graphics commands to an external graphics adapter such as graphics adapter 271. In the illustrated embodiment, graphics adapter 271 may include a graphics processor and circuitry (not shown) for generating or rendering digital images and converting the images into signals suitable for use by a display. Graphics adapter 271 may also transmit the digital images for storage in a system memory. Graphics interface 260 may be used to translate transactions between the I/O packet bus protocol and a graphics bus protocol such as the AGP protocol, for example. As mentioned above, graphics interface 260 may translate bus cycles received from graphics bus 270 into packet transactions for transmission on I/O packet bus link 215. In addition, graphics interface 260 may translate graphics packet transactions into bus cycles suitable for transmission upon graphics bus 270. Graphics interface 260 may also include arbitration and buffering logic (not shown) for scheduling graphics bus transactions and maintaining graphics transaction ordering rules.

As an alternative to using an external graphics adapter, a processor may send graphics commands to integrated graphics engine 250 via graphics interface 260. Graphics engine 250 may include a graphics processor and circuitry (not shown) for generating or rendering digital images and converting the images into signals suitable for use by a display. Graphics engine 250 may also transmit the digital images for storage and subsequent retrieval in a system memory. It is contemplated that the graphics signals may be in either an analog or digital format for driving a display such as an RGB monitor or an LCD display. Control register unit 255 may be configured to selectively enable or disable graphics engine 250. In addition, it is contemplated that control register unit 255 may also be configured to select other graphics related functions such as display resolution and timing, for example. Since graphics engine 250 is connected to graphics bus 270, it is contemplated that graphics engine 250 includes a bus interface (not shown) for formatting digital image information and commands into a format suitable for transmission on graphics bus 270 and vice versa.

Since in typical computer systems only one graphics processor may be in use at a given time, graphics engine 250 may be disabled while an external graphics adapter is used. Contrariwise, graphics engine 250 may be enabled when there is no external graphics adapter being used.

It is noted that in one embodiment, graphics engine 250 may be implemented as a lower end (i.e. less graphics functionality) graphics engine than some external graphics adapters that may be available. Thus, by integrating a graphics engine such as graphics engine 150 into the integrated circuit chip of a graphics node, a computer system provider may provide an alternative low-cost graphics solution to its customers by allowing them to use graphics engine 250. In contrast, for customers that prefer a higher-end (i.e. more graphics functionality) graphics solution, graphics engine 250 may be disabled via control register 156 and an external graphics adapter such as graphics adapter 271 may be connected to graphics bus 270 and used to drive a suitable display device.

Numerous variations and modifications will become apparent to those skilled in the art once the above disclosure is fully appreciated. It is intended that the following claims be interpreted to embrace all such variations and modifications.

What is claimed is:

1. An input/output node for a computer system, said input/output node comprising:
   a first transceiver unit implemented on an integrated circuit chip, wherein said first transceiver unit is configured to receive first packet transactions and to transmit second packet transactions on a first link of a packet bus;
   a second transceiver unit implemented on said integrated circuit chip, wherein said second transceiver unit is coupled to receive said second packet transactions and to transmit said first packet transactions on a second link of said packet bus;
   a packet tunnel implemented on said integrated circuit chip, wherein said packet tunnel is coupled to convey selected ones of said first and said second packet transactions between said first transceiver unit and said second transceiver unit;
   a graphics engine implemented on said integrated circuit chip, wherein said graphics engine is coupled to receive graphics packet transactions from said first transceiver unit and is configured to render digital image information in response to receiving said graphics packet transactions; and
   a graphics interface implemented on said integrated circuit chip, wherein said graphics interface is coupled to receive additional graphics packet transactions from said first transceiver unit and configured to translate said additional graphics packet transactions into transactions suitable for transmission upon a graphics bus.

2. The input/output node as recited in claim 1 further comprising a control unit implemented on said integrated circuit chip, wherein said control unit is coupled to control the conveyance of said selected ones of said first and said second packet transactions, said graphics packet transactions and said additional graphics packet transactions between said first transceiver unit and said second transceiver unit, between said first transceiver unit and said graphics engine and between said first transceiver unit and said graphics interface, respectively.

3. The input/output node as recited in claim 2, wherein said graphics engine is further configured to translate said digital image information into packet transactions suitable for transmission upon said first link of said packet bus.

4. The input/output node as recited in claim 3, wherein said graphics engine is further configured to receive said graphics packet transactions through said packet tunnel.

5. The input/output node as recited in claim 4, wherein said graphics engine further includes a configuration register, wherein said configuration register provides a user selectable bit for enabling and disabling said graphics engine.

6. The input/output node as recited in claim 5, wherein said graphics engine is further configured to provide signals corresponding to said digital image information for display.

7. The input/output node as recited in claim 6, wherein said graphics interface is further configured to receive said additional graphics packet transactions through said packet tunnel.

8. A computer system comprising:
   a processor;
   a packet bus including a first link and a second link, wherein said first link is coupled to said processor; and
   an input/output node coupled to said first link and to said second link, said input/output node including:
      a first transceiver unit implemented on an integrated circuit chip, wherein said first transceiver unit is configured to receive first packet transactions and to transmit second packet transactions on said first link of said packet bus;
      a second transceiver unit implemented on said integrated circuit chip, wherein said second transceiver unit is coupled to receive said second packet transactions and to transmit said first packet transactions on said second link of said packet bus;
      a packet tunnel implemented on said integrated circuit chip, wherein said packet tunnel is coupled to convey selected ones of said first and said second packet transactions between said first transceiver unit and said second transceiver unit;

a graphics engine implemented on said integrated circuit chip, wherein said graphics engine is coupled to receive graphics packet transactions from said first transceiver unit and is configured to render digital image information in response to receiving said graphics packet transactions; and a graphics interface implemented on said integrated circuit chip, wherein said graphics interface is coupled to receive additional graphics packet transactions from said first transceiver unit and configured to translate said additional graphics packet transactions into transactions suitable for transmission upon a graphics bus.

9. The computer system as recited in claim 8, wherein said I/O node further includes a control unit implemented on said integrated circuit chip, wherein said control unit is coupled to control the conveyance of said selected ones of said first and said second packet transactions, said graphics packet transactions and said additional graphics packet transactions between said first transceiver unit and said second transceiver unit, between said first transceiver unit and said graphics engine and between said first transceiver unit and said graphics interface, respectively.

10. The computer system as recited in claim 9, wherein said graphics engine is further configured to translate said digital image information into packet transactions suitable for transmission upon said first link of said packet bus.

11. The computer system as recited in claim 10, wherein said graphics engine is further configured to receive said graphics packet transactions through said packet tunnel.

12. The computer system as recited in claim 11, wherein said graphics engine further includes a configuration register, wherein said configuration register provides a user selectable bit for enabling and disabling said graphics engine.

13. The computer system as recited in claim 12, wherein said graphics engine is further configured to provide signals corresponding to said digital image information for display.

14. The computer system as recited in claim 13, wherein said graphics interface is further configured to receive said additional graphics packet transactions through said packet tunnel.

15. The computer system as recited in claim 14, wherein said packet bus is a point-to-point link compatible with HyperTransport™ technology.

16. An input/output node for a computer system, said input/output node comprising:

a first transceiver unit implemented on an integrated circuit chip, wherein said first transceiver unit is configured to receive first packet transactions and to transmit second packet transactions on a first link of a packet bus;

a second transceiver unit implemented on said integrated circuit chip, wherein said second transceiver unit is coupled to receive said second packet transactions and to transmit said first packet transactions on a second link of said packet bus;

a packet tunnel implemented on said integrated circuit chip, wherein said packet tunnel is coupled to convey selected ones of said first and said second packet transactions between said first transceiver unit and said second transceiver unit;

a graphics interface implemented on said integrated circuit chip, wherein said graphics interface is coupled to receive graphics packet transactions from said first transceiver unit and configured to translate said graphics packet transactions into graphics transactions suitable for transmission upon a graphics bus; and a graphics engine implemented on said integrated circuit chip, wherein said graphics engine is coupled to said graphics bus and configured to receive said graphics transactions from said graphics interface.

17. The input/output node as recited in claim 16 further comprising a control unit implemented on said integrated circuit chip, wherein said control unit is coupled to control the conveyance of said selected ones of said first and said second packet transactions and said graphics packet transactions between said first transceiver unit and said second transceiver unit and between said first transceiver unit and said graphics interface, respectively.

18. The input/output node as recited in claim 17, wherein said graphics engine is further configured to render digital image information in response to receiving said graphics transactions from said graphics interface.

19. The input/output node as recited in claim 18, wherein said graphics engine is further configured to translate said digital image information into graphics transactions suitable for transmission upon said graphics bus.

20. The input/output node as recited in claim 19, wherein said graphics engine further includes a configuration register, wherein said configuration register provides a user selectable bit for enabling and disabling said graphics engines.

21. The input/output node as recited in claim 20, wherein said graphics engine is further configured to provide signals corresponding to said digital image information for display.

22. The input/output node as recited in claim 21, wherein said graphics interface is further configured to receive said graphics packet transactions through said packet tunnel.

23. A computer system comprising:

a processor;

a packet bus including a first link and a second link, wherein said first link is coupled to said processor; and an input/output node coupled to said first link and to said second link, said input/output node including:

a first transceiver unit implemented on an integrated circuit chip, wherein said first transceiver unit is configured to receive first packet transactions and to transmit second packet transactions on said first link of said packet bus;

a second transceiver unit implemented on said integrated circuit chip, wherein said second transceiver unit is coupled to receive said second packet transactions and to transmit said first packet transactions on said second link of said packet bus;

a packet tunnel implemented on said integrated circuit chip, wherein said packet tunnel is coupled to convey selected ones of said first and said second packet transactions between said first transceiver unit and said second transceiver unit;

a graphics interface implemented on said integrated circuit chip, wherein said graphics interface is coupled to receive graphics packet transactions from said first transceiver unit and configured to translate said graphics packet transactions into graphics transactions suitable for transmission upon a graphics bus; and a graphics engine implemented on said integrated circuit chip, wherein said graphics engine is coupled to said graphics bus and configured to receive said graphics transactions from said graphics interface.

24. The computer system as recited in claim 23, wherein said I/O node further includes a control unit implemented on said integrated circuit chip, wherein said control unit is coupled to control the conveyance of said selected ones of said first and said second packet transactions and said graphics packet transactions between said first transceiver unit and said second transceiver unit and between said first transceiver unit and said graphics interface, respectively.

25. The computer system as recited in claim 24, wherein said graphics engine is further configured to render digital image information in response to receiving said graphics transactions from said graphics interface and to translate said digital image information into graphics transactions suitable for transmission upon said graphics bus.

26. The computer system as recited in claim 25, wherein said graphics engine further includes a configuration register, wherein said configuration register provides a user selectable bit for enabling and disabling said graphics engines.

27. The input/output node as recited in claim 26, wherein said graphics interface is further configured to receive said graphics packet transactions through said packet tunnel.

* * * * *